United States Patent

[11] 3,584,794

| [72] | Inventor | David E. Beach |
| | | Rochester, N.Y. |
| [21] | Appl. No. | 767,098 |
| [22] | Filed | Oct. 14, 1968 |
| [45] | Patented | June 15, 1971 |
| [73] | Assignee | Eastman Kodak Company |
| | | Rochester, N.Y. |

[54] FIRING MECHANISM FOR PERCUSSIVELY IGNITABLE FLASH UNITS
7 Claims, 5 Drawing Figs.

[52] U.S. Cl. .................................................. 240/1.3, 95/11.5
[51] Int. Cl. .................................................. G03b 15/02
[50] Field of Search ........................................... 95/11.5; 240/1.3; 431/92, 93

[56] References Cited
UNITED STATES PATENTS

| 590,204 | 9/1897 | Blackmore | 95/11.5 |
| 1,436,715 | 11/1922 | Jackson | 431/92 |
| 3,439,992 | 4/1969 | Shaffer | 431/93 |

Primary Examiner—John M. Horan
Assistant Examiner—Alan Mathews
Attorneys—Robert W. Hampton and John D. Husser ABSTRACT: A multiple flash unit containing percussively ignitable lamps and photographic apparatus such as a still camera for accepting and percussively firing the lamps successively. A striker to fire the lamps may be incorporated either in the multilamp unit or the apparatus and is cocked to fire the lamp in the operative position during indexing of the unit.

PATENTED JUN15 1971 3,584,794
SHEET 1 OF 2
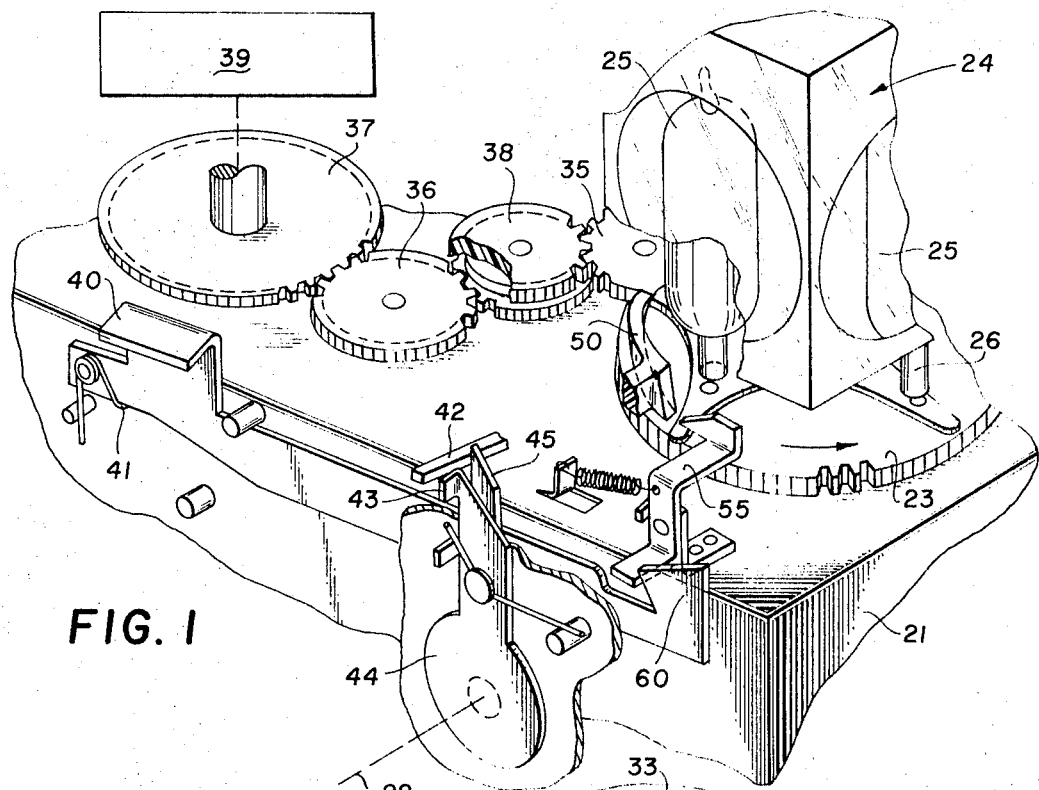
FIG. 1
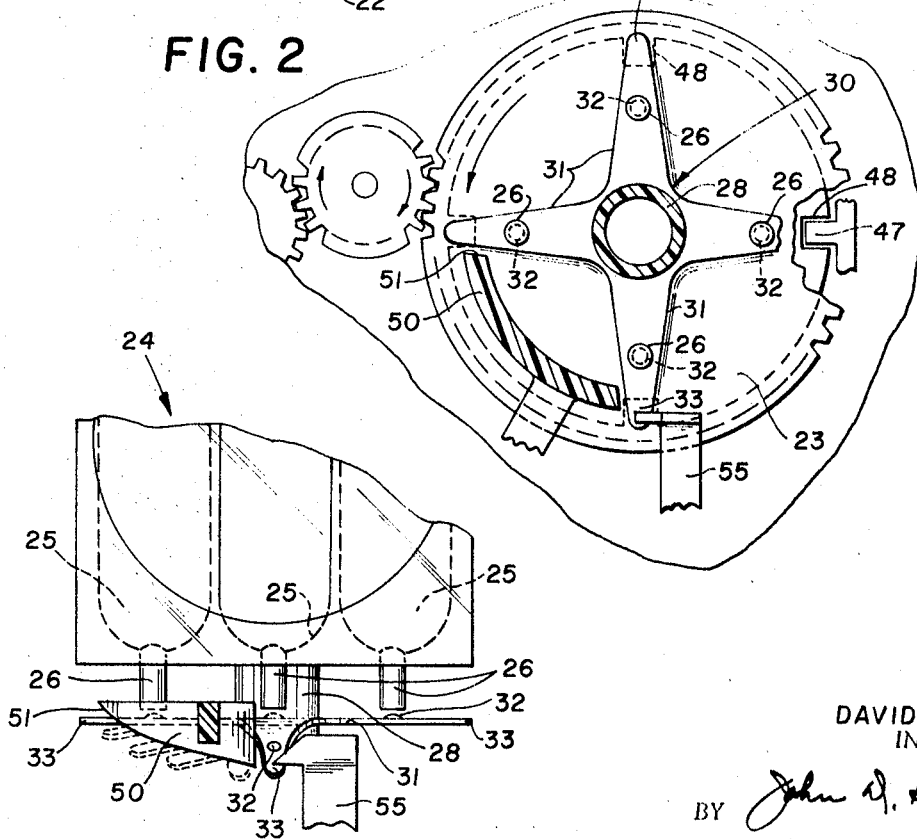
FIG. 2
FIG. 3
DAVID E. BEACH
INVENTOR.
BY John D. Husser
R.D. Hampton
ATTORNEYS PATENTED JUN 15 1971
3,584,794
SHEET 2 OF 2
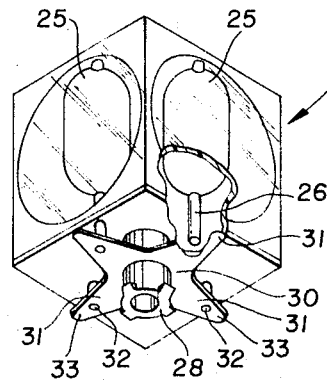
FIG. 4
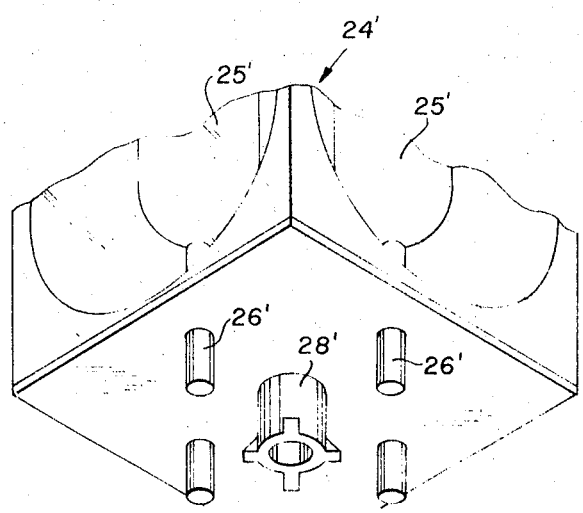
FIG. 5
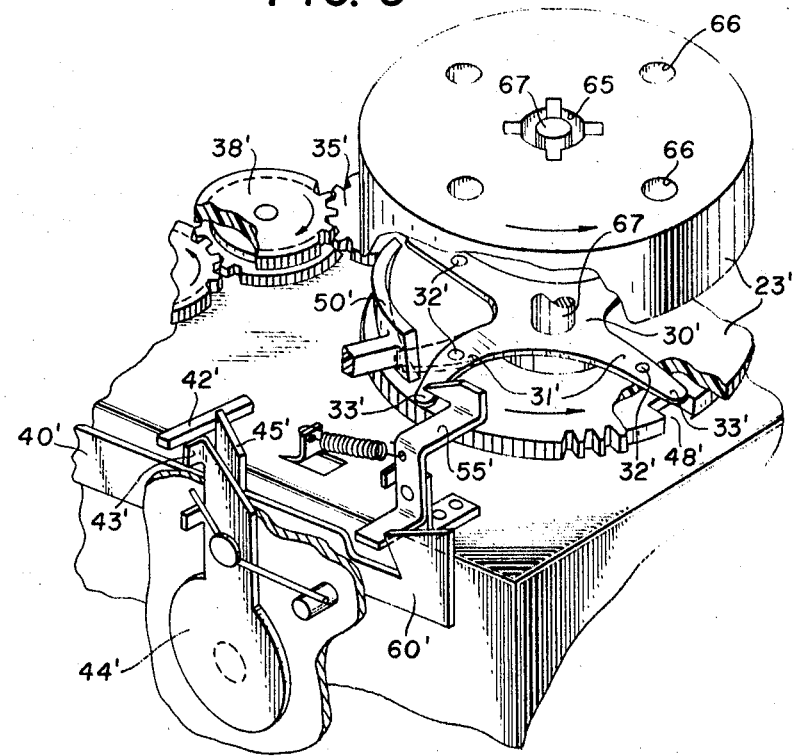
DAVID E. BEACH
INVENTOR.
BY John D. Husser
R.W. Hampton
ATTORNEYS

[1]

FIRING MECHANISM FOR PERCUSSIVELY IGNITABLE FLASH UNITS

CROSS-REFERENCE TO RELATED APPLICATIONS

Reference is made to the following copending U.S. applications:

U.S. application Ser. No. 765,930, entitled "Multilamp Flash Unit," filed Oct. 8, 1968, in the name of David E. Beach.

U.S. application Ser. No. 813,420, entitled "Percussion Activatable Flash Units Having Individual Striker Elements and Photographic Apparatus for using such Units," filed Apr. 4, 1969, in the name of David E. Beach.

U.S. application Ser. No. 767,101, 101, entitled "Impact Mechanism for Firing Percussion-Ignitable Multilamp Photoflash Unit," filed of even date herewith, in the name of David E. Beach.

BACKGROUND OF THE INVENTION

1. Field of the Invention

This invention relates to flash photography and more particularly, to photographic apparatus such as still cameras of flash adapters with built-in devices to fire percussively ignitable flashlamps.

2. Description of the Prior Art

Multiple flash units containing a plurality of electrically ignited flashlamps are known. Such a unit is described in U.S. Pat. No. 3,327,105.

Also, cameras or flash adapters employing such flash units are known, and devices, disclosed for example in U.S. Pat. No. 3,353,468, have been proposed to receive and index such flashcubes between operations of the camera exposure.

Recently, there has been developed a flashlamp that is percussively ignitable and also may be incorporated in a disposable multilamp photoflash unit or package containing a plurality of such lamps. Such percussively ignitable lamps and units are disclosed, for example, in copending U.S. applications Ser. No. 765,930, filed Oct. 8, 1968 "Multilamp Flash Unit," and Ser. No. 813,420, filed Apr. 4, 1969, "Percussion Activatable Flash Units Having Individual Striker Elements and Photographic Apparatus for using such Units"; both applications filed in the name of David E. Beach. The former application describes a multiple lamp unit in which the percussion element of each lamp is exposed for striking by suitable means. The latter application describes a package in which the percussion element of each lamp is contained within the unit and a percussion striker in the unit is exposed for release by suitable means.

SUMMARY OF THE INVENTION

The present invention is an improvement in a percussion striker mechanism for a unit containing such percussively fired lamps. As such, the invention comprises striker means to fire the lamp, the striker means being energized or cocked, as the unit is rotated or indexed to place a fresh flashlamp in the operating position, by movement of the striker means relative to control means.

In a preferred embodiment of the invention, individual striker elements for each lamp, positioned either in the apparatus or the unit, are provided and rotate with the unit to be cocked by a control member during the indexing of the unit as the respective lamps move to the firing position.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawing, in which:

FIG. 1 is a perspective view of a preferred embodiment of the invention showing a portion of a photographic still camera and a multiple flash unit containing a plurality of percussively fired lamps with the striker elements incorporated in the unit;

FIG. 2 is a partial top view of the embodiment of FIG. 1 with a portion of the flash unit shown in section;

FIG. 3 is a partial front view of the parts shown in FIG. 2;

FIG. 4 is a partially broken perspective view of a flash unit according to the embodiment of FIG. 1; and FIG. 5 is a perspective view showing a second embodiment of the invention, in which the striker elements are incorporated in the camera.

DESCRIPTION OF THE PREFERRED EMBODIMENTS

Because photographic apparatus such as cameras are well known, the present description will be directed in particular to elements forming part of, or cooperating more directly with, the present invention, camera elements not specifically shown or described herein being understood to be selectable from those known in the art.

With reference to FIG. 1, there is shown a portion of photographic roll film still camera comprising a camera body 21 having a picture-taking or lens axis 22 on which are located the usual focusing lens and film plane for holding a frame of a roll of photosensitive film (not shown). The camera shutter mechanism and diaphragm are also positioned to be in operative relationship along the axis 22 to expose a frame of film located at the film plane.

Accessibly located at the top wall of the camera body 21 is a multilamp package receiving socket 23 designed to receive a multilamp photoflash unit 24 containing a plurality (four) of percussively ignitable flashlamps 25. The lamps of package 24 and a suitable receiving socket are more fully described in the copending applications referred to above. The photoflashlamps 25 are ordinately mounted in a vertical position about a vertical axis of rotation on a substantially square base. Preferably, however, the end of a cap or tube 26 containing a percussively ignitable material that burns when the tube 26 is struck by a high energy percussion striker is exposed at the base of each lamp. Individual light reflectors are positioned behind each lamp 25 and an overall light-transmitting protective cover is provided. The package base defines the four lamp sides and includes a depending center connector post 28 that is received in an opening of socket 23 in any one of four predetermined positions in which one of the lamps 25 is in the operative position. The unit 24 is retained on the socket 23 by engagement of post 28 with releasable means in a known manner.

In the embodiment of the invention shown in FIGS. 1—3, a spider-shaped striker member 30 having four striker legs 31 and formed of a resilient or spring material that may be stressed to absorb energy is provided. Striker member 30 is fixed to the connecting post 28 with each leg 31 located adjacent a respective percussion tube 26. Each leg 31 defines a detent 32 engageable with the corresponding tube 27 and an end 33 engageable by a control member of the camera to cock the leg 31 in a manner to be described.

To index the socket 23 and received flash unit 24, a linkage such as gears 35 and 36 operatively connect the socket to a film-widening gear 37 that rotates a film takeup reel (not shown) in a counterclockwise direction (looking down) through a suitably geared friction clutch arrangement 38. Gear 37 is rotated by film-winding mechanism 39, that may also set the shutter operating mechanism, such as is described for example in U.S. Pat. No. 3,186,322. The shutter-operating mechanism is released by an accessible body release member 40 to expose the positioned film frame by admitting light along the axis 22 for a predetermined time. The shutter time and/or exposure aperture may be determined manually or automatically by any known means.

A suitable shutter mechanism comprises a shutter striking plate or driver (not shown) which has a finger 42 shown in the cocked position engageable with an ear 43 on a pivotable impact shutter blade 44. A latch 45 formed on the camera body release 40 normally is in the path of movement of finger 43 to prevent shutter operation by finger 42 until the body release 40 is depressed against the bias of a spring 41.

Referring to FIG. 2, the flash unit socket 23 receives the package connector post 28, with the lamp percussion tube ends 26 exposed to cooperate with the firing legs 31. The package-receiving socket 23 (and inserted multilamp package 24) is automatically indexed or repositioned to present a fresh lamp in the operative position after a flash exposure. The slip clutch 38 incorporated between the film wind gear 37 and socket 23 transmits rotation from gear 37 to socket 23 until socket rotation is terminated by engagement of a metering pawl 47 with one of four indexing notches 48 as described for example, in U.S. Pat. No. 3,353,468, when a subsequent lamp 25 is placed in the operative or firing position.

In accordance with the invention, there is located in the path of movement of legs 31 a wedge-shaped cam member 50. A leading edge 51 of cam member 50 is positioned to engage each leg 31 and move the leg downward to store energy during socket rotation. The leg 31 cooperating with the lamp 25 moving to its operative position thus moves to its cocked position as shown in solid lines in FIG. 3. When rotation is completed, a spring-loaded latch member 55 engages the end 33 of leg 31 to maintain the leg in its cocked position until camera operation.

For flash operation, illumination from the lamp 25 is synchronized with film exposures by a latch end 60 on release member 40 normally engaging latch member 55 when the striker leg 31 is cocked. When the body release 31 is depressed, latch end 60 cams latch 55 clockwise as shown in FIGS. 1 and 3 to release cocked leg 31. The stored energy in leg 31 then causes detent 32 to strike percussion tube 26 and fire the lamp in timed relation with camera operation.

In accordance with the embodiment of the invention shown in FIG. 5, the striker member forms part of the camera and is positioned to cooperate with the respective lamps as in the prior embodiment. In the embodiment of FIG. 5, elements corresponding in function to those of the embodiment of FIGS. 1—4 are identified by like numerals that are primed.

As shown in FIG. 5, the connecting post 28' of flash unit 24' is inserted into an access opening 65 of socket 23' with each percussion tube 26' being received by a respective hole 66. Spring member 30' is fixed to a central stabilizing stud 67 rotating with socket 23', and as in the prior embodiment, detents 32' of spring legs 31' are located adjacent the ends of the respective tube ends 26'. Also as in the prior embodiment, spring legs 31' are sequentially cocked with advancement of socket 23' by cooperation of leg ends 33' with cam control member 50'.

CAMERA OPERATION

To operate the photographic camera according to either embodiment of the invention shown, the connector post 28 of a multilamp flash unit 24 is placed in the socket 23.

If a fresh frame of film is not at the film plane on the lens axis 22, the film is advanced by operating the film advance mechanism 39, thereby moving an unexposed film frame onto the film plane and setting the shutter by cocking the shutter striking plate. Simultaneously, the socket 23 is rotated counterclockwise (looking down) until terminated after a quarter turn by metering pawl 47 engaging an indexing notch 48. During such rotation, the leg 31 of the lamp moving into operative position is cocked by cam 50 during movement of leg end 33 relative to cam 50. When rotation is terminated leg 31 is held in the cocked position by engagement of end 33 with latch member 55.

At this point, the camera is ready for operation with augmenting flash.

This is accomplished by aiming the camera in the desired direction and depressing the body release member 40 to its fully depressed position. This motion releases finger 42 of the cocked striking plate which rapidly strikes the shutter ear 45 to cause the shutter blade 40 to uncap the diaphragm aperture according to the predetermined time. Simultaneously, latch end 60 of release member 40 cams latch member 55 to release striker leg 31 and thereby fire the lamp 25 in the firing position. After firing, the metering pawl 47 is moved out of the notch 48, and socket 23 again rotated to move the next succeeding lamp 28 into the flash-operative position. After all four lamps in the inserted unit have been used, the unit 24 is removed or ejected in any known manner.

The invention has been described in detail with particular reference to preferred embodiments thereof, but it will be understood that variations and modifications can be effected within the spirit and scope of the invention. For example, it is evident that the tube ends may be confined within the flash unit as described in the latter of the two applications as described above. In that case, the striker legs cooperate with exposed pins that release preloaded firing pins within the flash unit.

I claim:

1. In photographic apparatus of the type having socket means for receiving a multilamp flash unit, the individual lamps of which are actuable by striking and which socket means is rotatable to successively place the lamps in firing position, the combination comprising:
   a striker member rotatable with said socket and having means energizeable for firing a lamp located at said firing position; and
   a control member having means for storing energy in the firing means during rotation of said striker member with said socket.

2. The combination according to claim 1 wherein the firing means comprises a resilient leg on the striker member movable between a cocked position to a released position, in which released position the lamp is fired, and the energizing means comprises a cam surface defined by the control member and engageable with the leg to move the leg to the energized position with movement of the unit to place the lamp in firing position.

3. The combination according to claim 1 and further comprising latch means to retain the leg in the energized position.

4. The combination according to claim 1 wherein the firing means comprises a plurality of resilient legs on the striker member, each resilient leg associated with a lamp and movable with the lamp, and wherein the energizing means comprises a cam engaging the leg with the lamp moving into the firing position.

5. The combination according to claim 4 wherein the striker member is fixed to the unit.

6. The combination according to claim 4 wherein the socket means is movable with the unit and the striker member is fixed to the socket means for movement with the socket means and received unit.

7. The combination according to claim 4 wherein the cam moves the engaged leg from a released position to a cocked position, and further comprising latch means for retaining the engaged leg in the cocked position until firing.